United States Patent [19]
Wada

[11] 4,239,627
[45] Dec. 16, 1980

[54] FILTERING MEMBER AND METHOD FOR MANUFACTURING THE SAME

[76] Inventor: Yoneji Wada, 32-2-1324 Takashimadaira 2-chome, Itabashi-ku, Tokyo, Japan

[21] Appl. No.: 73,034

[22] Filed: Sep. 6, 1979

[30] Foreign Application Priority Data

Mar. 16, 1979 [JP] Japan ............................ 54-34621[U]

[51] Int. Cl.[3] ............................................ B01D 27/04
[52] U.S. Cl. .................................. 210/484; 210/497.2
[58] Field of Search .................. 55/498, 500; 210/484, 210/497 R, 497 FB, 497.1, 498, 499, 507; 428/36, 71, 74, 75, 906

[56] References Cited

U.S. PATENT DOCUMENTS 2,083,546 6/1937 Aldham ................................ 210/484
3,807,570 4/1974 Allan ............................ 210/497 FB

*Primary Examiner*—Ivars C. Cintins
*Attorney, Agent, or Firm*—Lawrence I. Field

[57] ABSTRACT

A filtering member for use in a filter such as an oil filter for removing impurities of different sizes contained in a fluid such as a working oil in an oil pressure apparatus comprises a cylindrical body made of resilient or flexible and porous material such as fabrics, porous synthetic resin, etc, the porosity of the cylindrical body decreasing gradually toward a center thereof. The filtering member can be easily and inexpensively manufactured by winding or deforming a sheet like member made of resilient material having a uniform porosity over its thickness into a cylindrical body in such a manner that an outer portion is expanded or stretched, but an inner portion is compressed.

6 Claims, 5 Drawing Figures

2
4
1
3

FILTERING MEMBER AND METHOD FOR MANUFACTURING THE SAME

BACKGROUND OF THE INVENTION

This invention relates to a filtering member and more particularly to a cylindrical filtering member for use in an oil cleaner and the like.

There have been developed various kinds of filtering methods. These methods can be roughly classified into a surface filtering method and a bulk filtering method. In the surface filtering method impurities or admixtures contained in a liquid to be treated are collected or filtered out at a surface of a filtering member, i.e. a filtering material. When the impurities are deposited on the surface of a filtering member, resistance against a flow of the liquid passing therethrough is gradually increased and at last pores in the surface are completely clogged by the collected impurities, so that the filtering operation can no longer be effected. Therefore it is necessary to use a filtering member which has a very large surface area. This results in increase in size of a filter in which such a large filtering member is installed. On the contrary in the bulk filtering method impurities in a liquid are collected in a number of capillary spaces each having a sufficient length viewed in a direction of a liquid flow as well as in a number of small spaces in the bulk of the filtering member. In this manner the impurities are collected in the bulk of filtering material in a three dimensional manner and thus a great number of impurities can be filtered out by means of a filtering member having a relatively small volume.

By means of the bulk filtering method in order to remove impurities of different sizes in a liquid such as a working oil which circulates in an oil pressure apparatus use may be made of a composite body of cellulose having continuous pores, a sintered body, foamed synthetic resin, etc. However since the size of the impurities varies over a very wide range it is quite difficult to select suitable filtering material. If fine impurities are to be collected, a filtering member might be clogged within a relatively short time, and thus in order to prolong a useful time the filtering member has to be formed in such a manner that only impurities having large size can be collected. Then small impurities might remain in the oil without being filtered out and might damage the oil pressure apparatus. An ideal filtering member for the bulk filtering should have pores of large size at an upstream side and should have pores of small size at a downstream side viewed in a direction of a liquid flow. Then large impurities are collected at the upstream portion and small impurities at the downstream portion of the filtering member. In this manner the impurities of various sizes can be effectively collected in the bulk of the filtering member. Therefore the deterioration of the filtering material occurs equally or evenly at various portions thereof and thus the filtering efficiency is materially prolonged. From this view point a plurality of filtering layers having different porosities are stuck one upon the other to form a laminated filtering member. However such a filtering member is quite complicated in construction and can be manufactured only with difficulty. Therefore the cost of such a filtering member becomes rather high.

SUMMARY OF THE INVENTION

The present invention has for its object to provide a novel filtering member which can effectively collect impurities of various sizes.

It is another object of the invention to provide a filtering member which can maintain its very high filtering efficiency over its long life time.

It is still another object of the invention to provide a filtering member which has a porosity profile changing uniformly in the direction of the liquid flow.

According to the invention a filtering member for collecting impurities of different sizes contained in a fluid in a bulk filtering mode is provided comprising a substantially cylindrical body made of resilient and porous material, the cylindrical body having a porosity which decreases gradually toward a center of the cylindrical body.

The present invention also relates to a method for manufacturing a filtering member for use in a bulk filtering process.

It is still another object of the invention to provide a novel method for manufacturing a filtering member in a simple and inexpensive manner.

According to the invention a method for manufacturing a filtering member for use in filtering impurities of different sizes contained in a fluid in a bulk filtering mode is provided comprising a step of clamping a sheet like member made of resilient and porous material between a pair of resilient plates, the sheet like member having a uniform porosity over its thickness; and a step for winding an assembly of the sheet like member and the resilient plates into a substantially cylindrical body in such a manner that an outer portion of the cylindrical body is stretched, whereas an inner portion of the cylindrical body is compressed.

In a preferred embodiment of the invention said plates of sheet like members are formed by metal meshes and an assembly of the filtering member and the metal meshes are installed in a casing of a filter.

BRIEF DESCRIPTION OF THE DRAWINGS

FIGS. *3a* and *3b* are schematic views for explaining a change in porosity of the filtering material.

DETAILED DESCRIPTION OF THE PREFERRED EMBODIMENTS

Figure 1:
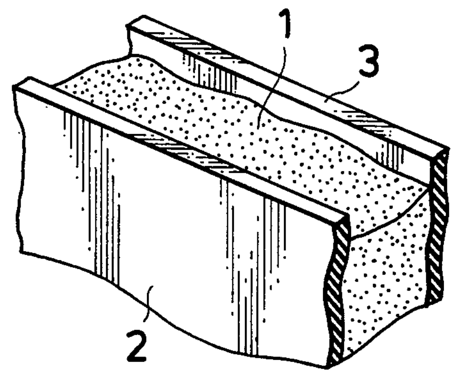
FIG. 1 is a partial perspective view illustrating a starting state of a filtering member according to the invention.
Figure 2:
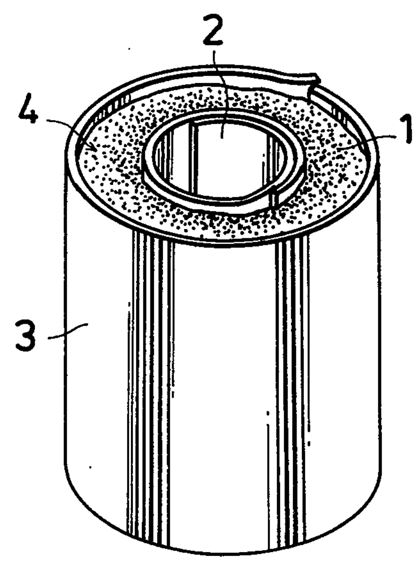
FIG. 2 is a perspective view showing an embodiment of a filtering member according to the invention.
Figure 3A:
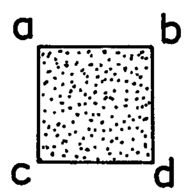
Figure 3B:
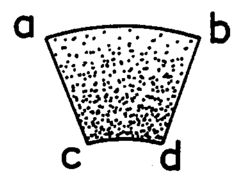

FIG. 1 shows a sheet like member 1 made of resilient and porous filtering material such as fabric, porous synthetic resin, etc. In a free state shown in FIG. 1 the sheet like member 1 has a uniform porosity over its whole thickness. According to the invention the sheet like member 1 is sandwiched between a pair of resilient plates 2 and 3 made of elastic material such as rubber and a whole assembly is deformed or wound into a cylindrical body as shown in FIG. 2. During this step a mandrel may be preferrably used to wind thereon the assembly of the sheet like member 1 and resilient plates 2 and 3. An inner portion of the sheet like member 1 adjacent to the inner plate 2 is compressed, but an outer portion of the member 1 adjacent to the outer plate 3 is expanded. Thus the porosity of the inner portion of the sheet like member 1 becomes smaller, but that of the outer portion becomes larger. As shown in FIG. 3a when the sheet like member 1 is in a flat form, its porosity is substantially uniform over its whole thickness but when the sheet like member 1 is wound into the cylindrical body, a side $\overline{ab}$ is expanded, but a side $\overline{cd}$ is shrunk. Therefore the size of pores formed in the sheet like member 1 becomes larger toward the outer portion but becomes smaller toward the inner portion. In this manner it is possible to obtain easily a filtering member having a porosity which decreases gradually toward a center of the cylindrical body.

Figure 4:
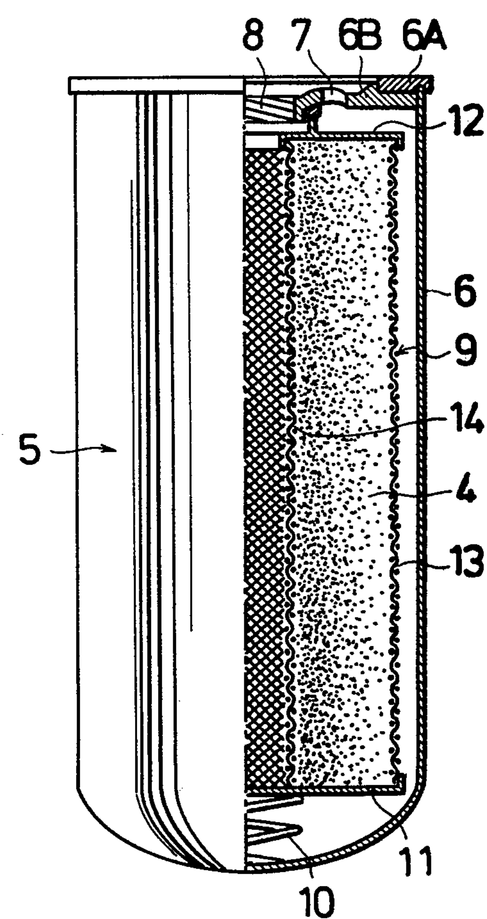
FIG. 4 is a partial cross section depicting a filter having the filtering member according to the invention installed therein.

The cylindrical filtering member 4 thus obtained is installed in a filter 5 as illustrated in FIG. 4. The filter 5 comprises a tubular casing 6 made of suitable metal. The casing 6 has an opening formed at its one side and the opening is closed by a flange 6A and a lid 6B. The lid 6B has formed therein an oil inlet 7 and an oil outlet 8. In the casing 6 is arranged a frame 9 comprising upper and lower discs 12 and 11 and inner and outer apertured cylindrical bodies 14 and 13 made of wire grating or mesh, punched metal plate. The frame 9 is held in the casing 6 by means of coiled spring 10. The filtering member 4 is provided in a space formed between the inner and outer cylindrical meshes 14 and 13. It should be noted the resilient plates 2 and 3 shown in FIG. 2 are removed.

An oil having impurities to be filtered out is introduced into the casing 6 through the inlet 7. Then the oil passes through the openings of outer cylindrical mesh 13 and passes through the filtering member 4 according to the invention from the outside to the inside. During the passage of the oil the impurities therein are filtered out in the bulk of the filtering member 4. In this case the impurities of larger size are collected in the outer portion of the filtering member, whereas the smaller impurities are collected in the inner portion of the filtering member 4. In this manner the impurities having different sizes are uniformly deposited over the whole thickness of the filtering member 4. Therefore no cake is formed near the outer cylindrical mesh 13 and thus the filter 5 can maintain the high filtering efficiency during its long life time.

The present invention is not limited to the embodiment explained above, but many modifications can be conceived within the scope of the invention. For instance, in the above embodiment the sheet like member 1 is deformed into a cylindrical body with the aid of the rubber plates 2 and 3, but use may be made of metal meshes. In such a case the assembly of the sheet like member and metal meshes may be directly fit in the filter casing. That is to say the metal meshes may be used as the cylindrical bodies 13 and 14 shown in FIG. 4.

As explained above in the filtering member according to the invention the size of pores varies continuously or gradually viewed in the direction of the fluid flow and thus the impurities of various sizes can be effectively collected uniformly in the bulk of the filtering member. In this manner the ideal bulk filtering can be achieved. Further the filtering member according to the invention can be easily manufactured and its cost can be made materially low.

What is claimed is:

1. A filtering member for collecting impurities of different sizes contained in a fluid in a bulk filtering mode comprising:

a substantially cylindrical body made of resilient and porous materials and formed by winding a rectangular sheet of resilient and uniformly porous material by one turn to form a central hollow space, the cylindrical body having a porosity which decreases gradually toward the central hollow space viewed in a radial direction, wherein the fluid to be filtered flows from an outer surface of the cylindrical body to the central hollow space.

2. A filtering member according to claim 1, wherin said cylindrical body is made of fabrics.

3. A filtering member according to claim 1, wherein said cylindrical body is made of porous synthetic resin.

4. A method for manufacturing a filtering member for use in filtering impurities of different sizes contained in a fluid in a bulk filtering mode comprising:

preparing a rectangular sheet of resilient and uniformly porous material;

clamping the sheet between a pair of resilient plates; and winding an assembly of the sheet and the resilient plates by one turn into a substantially cylindrical body having a central hollow space in such a manner that an outer portion of the cylindrical body is stretched and an inner portion of the cylindrical body is compressed, and the cylindrical body has a porosity gradient which decreases gradually towards the center hollow space viewed in a radial direction.

5. A method according to claim 4, wherein the assembly of the sheet like member and the resilient plates is wound into the substantially cylindrical body with the aid of a tubular mandrel.

6. A method according to claim 4, wherein a pair of wire meshes are used as said resilient plates.

* * * * *